United States Patent Office 3,440,264
Patented Apr. 22, 1969

3,440,264
FRACTIONATION OF ORGANIC COMPOUNDS OF HIGH MOLECULAR WEIGHT
Donald E. McVannel, Merrill, Mich., assignor to Dow Corning Corporation, Midland, Mich., a corporation of Michigan
No Drawing. Filed Apr. 4, 1966, Ser. No. 539,746
Int. Cl. C07f 7/18; C07c 3/00
U.S. Cl. 260—448.2                      12 Claims

ABSTRACT OF THE DISCLOSURE

A process of fractionating a liquid mixture of organic compounds of molecular weight over 300 by placing the mixture on one side of a barrier membrane made of cured organopolysiloxane elastomer and a volatile non-reactive liquid on the other side of the barrier membrane is disclosed.

This application relates to a process for fractionating mixtures of organic compounds which have high molecular weights. The process is particularly advantageous for fractionating materials having a number average molecular weight of at least 500, since distillation of such materials becomes difficult.

More specifically, this application relates to the process of fractionating a liquid mixture of organic compounds containing species having different molecular weights of over 300, comprising (1) placing said mixture in contact with one side of a barrier membrane made of a cured organopolysiloxane elastomer, (2) placing a volatile nonreactive liquid in contact with the other side of said barrier membrane, said volatile liquid being a solvent for said mixture of organic compounds, and said volatile liquid also having the capability of causing a ⅛ inch thick strip of the organopolysiloxane elastomer used herein to increase its volume by swelling at least 10 percent upon two hours of immersion in said volatile liquid at 25° C.

It has been discovered that silicone elastomers, particularly those which contain primarily dimethylpolysiloxane, show a unique permeability to many organic compounds of higher molecular weight; they pass through a membrane or barrier made of silicone rubber at a rate which is dependent on their molecular weight and which is far more rapid than through other crosslinked organic elastomer or resin membranes.

The above-mentioned barrier membrane can be of any configuration which prevents the flow of liquid from one side of the membrane to the other by any means other than through the membrane itself. For example, the barrier membrane can be one or more partitions in a chamber, or it can be a simple tube where the ends are closed or otherwise inaccessible to the area immediately outside of the tube.

Any cured organopolysiloxane elastomer can be used herein. Stocks for formulating such cured elastomers are well-known and commercially available, and a detailed discussion of their preparation and composition is therefore unnecessary. Typical polysiloxanes used in the preparation of silicone rubber are polymers containing units selected from the following: dimethylsiloxane, phenylmethylsiloxane, diphenylsiloxane, 3,3,3 - trifluoropropylmethylsiloxane, methylvinylsiloxane, phenylmethylvinylsiloxane, etc.

The silicone elastomers used herein must possess permeability, as well as sufficient strength to withstand the osmotic pressures which are generated during the process of this invention. The presence of a reinforcing filler, usually a form of finely-divided silica or a cogel of $SiO_{4/2}$ units and organosiloxy units such as $(CH_3)_3SiO_{1/2}$, is usually desirable in order to give the elastomer adequate strength. However, one should note that the permeability of the elastomer decreases as its filler content increases.

The permeability of silicone elastomers is also dependent on their crosslink density, the highest permeability being obtained by the lowest crosslink density.

If desired, the silicone elastomer can be deposited on a supporting porous framework to add to the strength of the barrier membrane. Examples of suitable frameworks are copper, steel, vulcanized rubber, or crosslinked plastic mesh, or fabric such as cloth. Similarly, the silicone elastomer can be impregnated with glass fibers or fabric.

The term "cured" is intended to imply that the elastomer is sufficiently crosslinked so as to be insoluble in organic solvents.

Any volatile, nonreactive liquid having the requisite requirements is useable herein. The term "nonreactive" is meant to imply that the liquid does not chemically decompose either the barrier membrane or the organic compounds to be fractionated.

Examples of suitable volatile, nonreactive liquids vary with the nature of the organopolysiloxane elastomer and the mixture of organic compounds, and are easily determinable by those skilled in the art for each given type of silicone elastomer and mixture of organic compounds. It is preferred for the liquid used to swell the silicone elastomer by at least 25 percent in the below-described test. For silicone elastomers which are made primarily of dimethylsiloxane and/or phenyl-containing siloxanes, suitable solvents for use herein are the hydrocarbons such as hexane, heptane, 2,2,4-trimethylpentane, cyclohexane, styrene, cyclohexene, benzene, n-propylbenzene, xylene, and naphtha; silicones such as hexamethyldisiloxane, diphenyltetramethyldisiloxane, and octamethylcyclotetrasiloxane; ketones such as methylethylketone, diisobutyl ketone, methylamyl ketone, and cyclohexanone; esters such as methylamyl acetate, ethylacetate, isopropyl acetate; and halogenated solvents such as carbon tetrachloride, chloroform, ethylene dichloride, methylene chloride, chlorobenzene, and bromopentane.

Certain ethers such as dioxane are also operative with some silicone elastomers.

For silicone elastomers which contain a high proportion of 3,3,3-trifluoropropylmethylsiloxane, the more polar solvents generally give the best results, e.g., ketones such as diisobutyl ketone, methylamyl ketone, methylethyl ketone, and cyclohexanone; esters such as ethyl acetate, isopropyl acetate, and ethyleneglycoldimethyl acetate; halogenated solvents such as ethylenedichloride, hexafluoroxylene, chloroform, o-dichlorobenzene, 1,1,1-trichloroethane and $CF_2ClCCl_2F$; and other polar solvents such as acetonitrile, dioxane, dimethylether, tetrahydrofuran, tetramethylene sulfone, and

Hydrocarbon solvents such as toluene or o-xylene can also sometimes be operative.

Three methods for determining the volume swell of silicone rubber are described by Seeley in "The Journal of Applied Polymer Science" (United Kingdom) 9 (10) 3285–93 (1965). A simple method is to measure the displacement of a liquid by the elastomer before and after swelling.

A "volatile liquid" is generally one which has a boiling point of about 180° C. or below at atmospheric pressure.

The process of this invention is operative on most organic compounds which have the requisite molecular weight and which are hydrophobic. Examples of such materials are hydrocarbons such as crude oil, mineral oil, paraffinic base, naphthalenic base, paraffin, tar, polyethylene, polypropylene, polystyrene, polyisobutylene, polybutadiene, poly(butadiene-styrene), polyisoprene, natural rubber gum, terpene resins, rosin, gutta percha, and poly(ethylene-propylene-hexadiene-1,4).

Also operative as the fractionatible mixture are the organopolysiloxanes such as dimethylpolysiloxane, phenylmethylpolysiloxane, 3,3,3-trifluoropropylmethylpolysiloxane; and cohydrolyzates containing xenylsiloxane and phenylmethylsiloxane units; dichlorophenylsiloxane and octylmethylsiloxane units; trimethylsiloxane and $SiO_{4/2}$ units; phenylsiloxane, propylmethylsiloxane, and tolyldimethylsiloxane units; trimethylsiloxane, dimethylsiloxane, and 3,3,3-trifluoropropylsiloxane units; methylallylsiloxane and

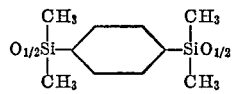

units; phenylmethylsiloxane, phenylvinylsiloxane, and phenylmethylvinylsiloxane units; and cyclohexylsiloxane and

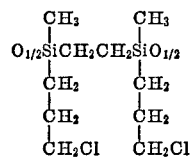

units.

Other operative fractionatible mixtures can comprise polytriazines such as those of the unit formula

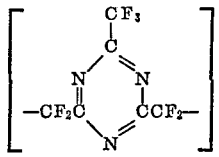

(many species of which are soluble in hexafluoroxylene and similar solvents); fatty materials such as lard and drying oils, oil-soluble phenol-formaldehyde resins, polyester resins such as ethylene glycol terephthalate; substituted vinyl resins such as polyvinylchloride, polyvinylidene chloride, poly(vinylchloride-vinylidene chloride), poly(styrene-acrylonitrile), polyvinylacetate, polymethylmethacrylate, polyethylacrylate, poly(tetra-fluoroethylene-vinylidenefluoride), and polyvinylfluoride; other halogenated polymers such as polychloroprene; chlorinated paraffin; polyethers such as poly(tetrahydrofuran); poly(butadieneacrylonitrile), uncured epoxy resins, and coumarone-indene resins.

The apparatus used herein can be of a batch-processing type or of a continuous processing type. Examples of both are shown below.

It is preferred for the barrier membrane to have a wall thickness of no less than 20 mils and no more than 300 mils. Wall-thickness is not, however, critical to the operation of the invention, although the rate of diffusion drops as the wall-thickness increases. It is, nevertheless, possible to operate this invention with a barrier membrane which is even a half-inch thick, especially if the mixture of organic compounds to be fractionated is under pressure.

A solvent for the organic mixture which can permeate the silicone elastomer is added to the mixture of organic compounds if it is desired to lower the maximum osmotic pressure encountered on the side of the membrane where the mixture of organic compounds is located, or if it is desired to hasten the process by fluidizing the organic mixture.

The process is generally operative at room temperature, but neither temperature nor pressure are critical as long as a liquid phase is maintained in contact with both sides of the membrane, and the membrane is strong enough to endure the pressure. Increased temperature can sometimes be used to increase the solubility of the material to be fractionated in the volatile, nonreactive liquid used.

The process of this invention is useful for preparing organic materials of more uniform molecular weight, which can result in significant changes in the properties of the materials. For example, dimethylpolysiloxane gum from which the lower molecular weight species have been removed exhibits oleophobic properties while standard dimethylpolysiloxane gum does not. The process can also be used to fractionate silicone or epoxy resins, improving the adhesiveness of these materials by removing their lower molecular weight fractions; to purify used motor oil, crude oil, or other oils; or to fractionate polymers such as polyisoprene, polyethylene, polystyrene, polypropylene, polyisobutylene, or polyesters in order to obtain improved properties.

The following examples are illustrative only and should not be construed as limiting the invention, which is properly delineated in the appended claims.

EXAMPLE 1

Twelve feet of ⅜ inch tubing (80 mill wall thickness) were made from a commercial silica-filled, dimethylpolysiloxane elastomer which was vulcanized by the action of heat and an organic peroxide upon a small number of silicon-bonded vinyl groups on the siloxane polymer.

This tube was filled with a 50 weight percent solution of toluene of a hydroxyl-endblocked dimethylpolysiloxane gum having a Williams plasticity of 0.055 in., and both ends of the tube were sealed.

The tube was then coiled into a container holding 4 liters of toluene, and allowed to remain there for 48 hours.

The tube's contents were then removed, the toluene was evaporated, and the residue stripped to 150° C.

The remaining product was a dimethylpolysiloxane gum having a Williams plasticity of 0.070 in., indicating a significant increase in molecular weight over the original polysiloxane gum.

When the toluene remaining in the container outside of the tube was distilled, a dimethylpolysiloxane residue was found which was a viscous fluid.

EXAMPLE 2

Twelve feet of ⅝ inch tubing (80 mil wall thickness) were made from the dimethylpolysiloxane elastomer of Example 1.

There was placed into this tube 1200 g. of a 65.7 weight percent solution in xylene of a copolymer of about 0.9 molar part of $[(CH_3)_3SiO_{1/2}]$ units, 0.04 part of

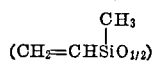

units, and 1 molar part of $(SiO_{4/2})$ units, having a number average molecular weight of about 3000 as determined by vapor pressure osmometry.

The tube was sealed at both ends and placed in a 5 gallon container of hexane, having an apparatus that continually siphoned off the hexane, distilled it, and returned the distilled hexane to the container while holding any distillation residue apart for collection.

This distillation residue was collected (a) after one day of operation, (b) after 3 days, (c) after 7 days, and (d) after 14 days. The contents of the rubber tube were then removed, and the solvent allowed to evaporate.

The solvent-free fractions had the properties listed below:

| Fraction | Weight of fraction (g.) | Weight percent carbon | Molecular weight by gel permeation chromatography, calibrated for polydimethylsiloxane | | Molecular weight by vapor phase osmometry |
|---|---|---|---|---|---|
| | | | Number average | Weight average | (Number average) |
| (a) | 351.6 | 28.45 | 1,531 | 2,105 | 1,460 |
| (b) | 116.3 | 24.35 | 2,701 | 3,520 | 4,130 |
| (c) | 81.6 | 23.85 | 3,751 | 4,645 | 5,370 |
| (d) | 1 | | | | |
| Tube residue | 235 | 21.25 | 9,486 | 15,758 | >15,000 |

EXAMPLE 3

Eighteen feet of tubing made from the silicone rubber of Example 1, having an outer diameter of 1.108 cm. and an inner diameter of 0.956 cm. (about 30 mils wall thickness) were filled with a 65.3 weight percent solution in xylene containing 539 g. of the siloxane copolymer used in Example 2, and sealed at both ends.

This was placed in a 6 gallon container of hexane which was equipped with the distilling and recycling apparatus used in Example 2.

This operation was repeated seven times, each with a different time of operation. Following each operation the residue in the tube was stripped of solvent and analyzed with the following results:

| Time of reaction (hrs.) | Weight percent siloxane extracted | Specific gravity of residue | Mol wt. by vapor phase osmometry (No. av.) | Mol wt. by membrane osmometry (No. av.) |
|---|---|---|---|---|
| 4 | 19 | | 5,770 | |
| 8 | 34 | 1.272 | 11,750 | |
| 16 | 47 | 1.287 | 13,080 | 13,300 |
| 32 | 58 | 1.291 | | 17,600 |
| 64 | 65 | 1.299 | | 23,000 |
| 128 | 71 | 1.300 | | 23,500 |
| 256 | 77 | 1.301 | | 35,700 |

EXAMPLE 4

Thirty feet of a tube made of the silicone rubber of Example 1, having a wall thickness of 60 mils and an outer diameter of 5/8 inch were prepared and filled with a 50 weight percent hexane solution containing 500 g. of

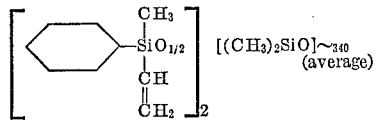 [(CH$_3$)$_2$SiO]$_{\sim 340}$ (average)

The tube was sealed at both ends and placed in a 6 gallon container of hexane which was equipped with the recycling and distilling apparatus of Example 2.

After 424 hours the contents of the tube were stripped to yield 369.8 g. of a silicone polymer residue.

The initial silicone polymer and the extracted residue product were both analyzed by gel permeation chromatography with the following results:

| | Molecular weight | | Polydispersity |
|---|---|---|---|
| | Number Average | Weight Average | Wt. av. mol. wt. / No. av. mol. wt. |
| Initial polymer | 17,029 | 51,350 | 3.015 |
| Extracted polymer | 36,219 | 62,888 | 1.736 |

EXAMPLE 5

Eighteen feet of tubing made from the silicone rubber used in Example 1, having a 3/8 inch inner diameter and a 30 mil wall-thickness were filled with 800 cc. of a 40 weight percent solution in xylene of a polysiloxane of the unit formula (C$_6$H$_5$SiO$_{3/2}$), and containing an average of about 4 weight percent of silicon-bonded hydroxyl groups.

The tube was sealed and placed in a 6 gallon container of toluene which was equipped with the distillation and recycling apparatus of Example 2.

After 66 hours of operation, the contents of the tube were stripped to 150° C. to yield 106 g. of silicone polymer. The residue in the distillation apparatus yielded 205 g. of silicone polymer.

Vapor pressure osmometry showed that the number average molecular weight of the initial polysiloxane polymer was 3995; the average molecular weight of the silicone polymer obtained from the tube was 7000; and the average molecular weight of the silicone polymer collected in the distillation apparatus was 2640.

EXAMPLE 6

Into eighteen feet of the silicone rubber tubing of Example 5 there was placed a mixture of 200 ml. (175.6 g.) of mineral oil having a number average molecular weight of 512, and 300 ml. of hexane.

The tube was sealed at both ends and placed in a six gallon container of hexane fitted with the recycling and distilling apparatus of Example 2.

The distillation residue was removed after (a) 3 hours, (b) 6 hours, (c) 24 hours, (d) 48 hours, and (e) 52 hours of operation. The molecular weights of these liquid fractions and the residue in the tube were determined by vapor pressure osmometry after removal of the hexane:

| Fraction | Amount recovered (g.) | No. average molecular wt. |
|---|---|---|
| (a) | 5.4 | 478. |
| (b) | 23.7 | 498. |
| (c) | 119.6 | 517. |
| (d) | 9.0 | 551. |
| (e) | 0.3 | Undetermined. |
| Residue from tube | 0.2 | Undetermined, but the residue was a wax, not an oil, indicating higher molecular weight. |

EXAMPLE 7

(A) Into 18 feet of the silicone rubber tubing of Example 5 there was placed a 50 weight percent solution in toluene of a polysiloxane cocondensate of the average unit formula

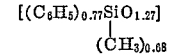

and containing a small percentage of silicon-bonded hydroxyl groups.

The tube was sealed and placed in a six gallon container of toluene fitted with the recycling and distilling apparatus of Example 2.

The distillation residue was collected after (a) 8.5 hours and (b) 43 hours of operation. The devolatilized products obtained therefrom were of the following description:

| Fraction | Wt. percent of total cocondensate in fraction | Description of material in fraction |
|---|---|---|
| (a) | 15 | Moderately viscous fluid. |
| (b) | 20 | Dark yellow, highly viscous fluid. |
| Tube residue | 65 | Solid, sticky, plastic material having a melting point of about 30° C. |

All fractions consisted of portions of the polysiloxane cocondensate of differing molecular weight.

(B) The above experiment was repeated on a continuous process basis by slowly and continuously adding the solution of polysiloxane cocondensate to one end of the tube, and withdrawing it from the other end at such a rate that each portion of solution theoretically remained in the tube for about 40 hours. The tube residue was collected at the exit end of the tube and found to be similar to the polysiloxane tube residue of experiment (A) above.

The fraction obtained by distilling the xylene outside of the tube was a viscous silicone fluid which was similar to a combination of fractions (a) and (b) of experiment (A) above.

EXAMPLE 8

When a 20 foot, one-half inch tube of a silica-filled, cured elastomer prepared from 3,3,3-trifluoropropylmethylpolysiloxane, having a wall thickness of 40 mils, is filled with a dispersion containing 85 weight percent of 1,1,2-trifluorotrichloroethane solvent and 15 weight percent of poly(vinylidene fluoride-perfluoropropene), 80 mol percent of the polymer units consisting of vinylidene fluoride, which polymer has an average molecular weight of over 400, immersion of the sealed tube in 1,1,2-trifluorotrichloroethane for 48 hours at room temperature yields a residue in the tube which contains a poly(vinylidene fluoride-perfluoropropene) of increased average molecular weight.

EXAMPLE 9

When glass fabric is impregnated with a 30 weight percent toluene dispersion of

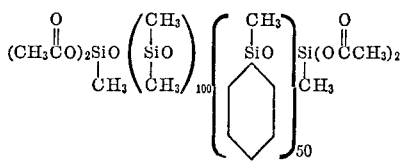

and allowed to vulcanize by exposure to moist air to form a reinforced, pore-free barrier membrane of silicone elastomer, and a chamber is completely partitioned by this membrane; the placing of a 40 weight percent cyclohexane solution of polypropylene having an average molecular weight of over 1000 on one side of the partition, while placing pure cyclohexane on the other side of the partition, results in the migration of the lower molecular weight species of the polypropylene through the partition, thus purifying a high molecular weight fraction.

EXAMPLE 10

When 40 feet of a 2 inch tube of a silica-filled, peroxide-cured elastomer made from a vinylated phenylmethylpolysiloxane having a wall thickness of 175 mils is partially filled with a phenylmethylpolysiloxane obtained from the hydrolysis and condensation of phenylmethyldichlorosilane, and having an average molecular weight of over 400, and when the sealed tube is placed in cyclohexanone for 5 days, the silicone residue remaining in the tube exhibits an increased molecular weight.

EXAMPLE 11

A 28 foot tube having an inner diameter of ⅜ inch and a wall thickness of 31 mils was prepared from a cured commercially-available silicone elastomer stock containing 100 parts by weight of a copolymer gum of 99.5 mol percent 3,3,3-trifluoropropylmethylsiloxane units and 0.5 mol percent methylvinylsiloxane units, 42 parts of powdered silica filler, 16 parts of a hydroxylated 3,3,3-trifluoropropylmethylpolysiloxane fluid, 1.5 parts of a vinylated dimethylpolysiloxane gum, and 1 part of a peroxide curing catalyst.

There was placed in this tube 320 g. of a hydroxyl-endblocked 3,3,3-trifluoropropylmethylsiloxane fluid having a viscosity of 543.7 cs. at 25° C., as a 40 weight percent solution in methylisobutylketone. The tube was sealed at both ends and placed in a 6 gallon container of methylisobutylketone.

After 4 days the tube contents were removed and stripped of volatiles. The residue consisted of 83.6 g. of a 3,3,3-trifluoropropylmethylpolysiloxane which had a viscosity at 25° C. of 821.8 cs.

The contents of the 6 gallon container were also removed and stripped of volatiles. The residue consisted of 226.4 g. of a 3,3,3-trifluoropropylmethylpolysiloxane which had a viscosity at 25° C. of 321 cs.

EXAMPLE 12

(a) A 36 inch tube having an interior diameter of ³⁄₁₆ inch and a wall thickness of ¹⁄₁₆ inch, and made from the cured silicone elastomer of Example 1, was filled with a 26.7 weight percent solution in n-butanol of a dimethylpolysiloxane having a viscosity at 25° C. of 100 cs. The tube was sealed and placed in a 4 liter container of n-butanol at room temperature.

After 5 days, the contents of the tube were stripped of volatiles. About 25 percent of the dimethylsiloxane remained, the rest having diffused through the tube wall.

(b) Equivalent results were obtained upon substituting 3,3,3-trifluorpropylmethylpolysiloxane for the dimethylpolysiloxane, and methylisobutylketone for the n-butanol.

After 5 days, about one-eighth of the silicone polymer remained inside of the tube.

The foregoing examples show that fractionation results when the process described in the examples is maintained for a time sufficient until at least one of the lowest molecular weight species of over 300 has passed through said barrier membrane.

That which is claimed is:

1. A process of fractionating a liquid mixture of organic compounds containing species having different molecular weights of over 300, comprising:
   (1) placing said mixture in contact with one side of a barrier membrane made of a cured organopolysiloxane elastomer,
   (2) placing a volatile nonreactive liquid in contact with the other side of said barrier membrane, said volatile liquid being a solvent for said mixture of organic compounds, and said volatile liquid also having the capability of causing a ⅛ inch thick strip of the organopolysiloxane elastomer used herein to increase its volume by swelling at least 10 percent upon two hours of immersion in said volatile liquid at 25° C., and
   (3) maintaining the above for a time sufficient until at least one of the lowest molecular weight species of over 300 has passed through said barrier membrane whereby fractionation results by the more rapid passage of the low molecular weight species through said barrier membrane.

2. The process of claim 1 where said barrier membrane is in the form of a tube.

3. The process of claim 1 where said mixture of organic compounds has species having a molecular weight of at least 1000.

4. The process of claim 1 where said mixture of organic compounds consists essentially of organopolysiloxanes.

5. The process of claim 1 where said mixture of organic compounds is essentially hydrocarbon.

6. The process of claim 1 where said barrier membrane has a wall thickness of no less than 20 mils and no more than 300 mils.

7. The process of claim 1 where said barrier membrane is made of a silica-filled, organopolysiloxane elastomer consisting primarily of dimethylpolysiloxane.

8. The process of claim 1 where said mixture of organic compounds is placed in contact with said barrier membrane while dispersed in at least one-half its weight of a solvent useable as the volatile, nonreactive liquid in said process.

9. The process of claim 1 where said volatile nonreactive liquid is continuously removed, distilled, and recycled to the barrier membrane, whereby that part of said mixture of organic compounds which has passed through said membrane is isolated.

10. The process of claim 1 where said barrier membrane is made of a silica-filled, organopolysiloxane elastomer consisting primarily of 3,3,3-trifluoropropylmethylpolysiloxane.

11. The process of claim 1 wherein said barrier membrane is supported by a porous framework to add to the strength of said barrier membrane.

12. The process of claim 11 wherein the porous framework is glass fabric.

References Cited

UNITED STATES PATENTS

| | | | |
|---|---|---|---|
| 2,947,687 | 8/1960 | Lee | 208—308 XR |
| 2,960,462 | 11/1960 | Lee et al. | 208—308 |
| 2,985,588 | 5/1961 | Binning et al. | 208—308 XR |
| 3,299,157 | 1/1967 | Baddour et al. | 208—308 XR |
| 3,007,956 | 11/1961 | Linville et al. | 260—448.2 |

TOBIAS E. LEVOW, *Primary Examiner.*

J. P. PODGORSKI, *Assistant Examiner.*

U.S. Cl. X.R.

260—46.5, 2; 208—308